(12) United States Patent
Gong et al.

(10) Patent No.: US 10,505,173 B2
(45) Date of Patent: Dec. 10, 2019

(54) CONNECTOR HAVING A NARROW TRANSITION PART DISPOSED BETWEEN TWO ADJACENT WINDING ELECTRODE CORES OF BATTERY, AND BATTERY COMPRISING THE SAME

(71) Applicant: BYD COMPANY LIMITED, Shenzhen, Guangdong (CN)

(72) Inventors: Xubin Gong, Shenzhen (CN); Yanfei Zhou, Shenzhen (CN); Lili Li, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 244 days.

(21) Appl. No.: 15/389,842

(22) Filed: Dec. 23, 2016

(65) Prior Publication Data

US 2017/0110706 A1   Apr. 20, 2017

Related U.S. Application Data

(63) Continuation of application No. PCT/CN2015/076802, filed on Apr. 16, 2015.

(30) Foreign Application Priority Data

Jun. 30, 2014  (CN) .................... 2014 2 0352774 U
Jun. 30, 2014  (CN) .................... 2014 2 0358158 U

(51) Int. Cl.
  *H01M 2/30*  (2006.01)
  *H01M 2/26*  (2006.01)
(52) U.S. Cl.
  CPC ............. *H01M 2/263* (2013.01); *H01M 2/30* (2013.01)

(58) Field of Classification Search
  CPC ............. H01M 2/263; H01M 10/0431; H01M 10/0587; H01M 2/26; H01M 2/266;
  (Continued)

(56) References Cited

U.S. PATENT DOCUMENTS

2006/0051664 A1* 3/2006 Tasai ................ H01M 2/266
                                                      429/161
2011/0159356 A1* 6/2011 Tozuka ............. H01M 2/263
                                                      429/179
(Continued)

FOREIGN PATENT DOCUMENTS

CN  101308920 A  11/2008
CN  102668177 A   9/2012
(Continued)

OTHER PUBLICATIONS

International Search Report and Written Opinion for Application No. PCT/CN2015/076802, dated Jul. 2, 2015, 12 pages.

*Primary Examiner* — Imran Akram

(57) ABSTRACT

The present disclosure provides a connector for battery and a battery having the same. The connector includes: a terminal connecting part configured to be connected with an electrode terminal of the battery; an electrode core connecting part configured to be connected with a winding electrode core of the battery, and having a first connecting plate and a second connecting plate opposite to each other; and a transition part connected between the terminal connecting part and the electrode core connecting part, configured to be fitted within a gap between two tabs of two adjacent winding electrode cores, and having a shape matched with that of the gap.

19 Claims, 5 Drawing Sheets

(58) Field of Classification Search
CPC ...... H01M 10/04; H01M 10/058; H01M 2/18; H01M 2/202; H01M 2/24
See application file for complete search history.

(56) References Cited

U.S. PATENT DOCUMENTS

| | | | | |
|---|---|---|---|---|
| 2011/0171516 A1* | 7/2011 | Byun | ................. | H01M 2/263 429/161 |
| 2011/0183165 A1* | 7/2011 | Byun | ................. | H01M 2/0202 429/61 |
| 2011/0195286 A1* | 8/2011 | Aota | ................. | H01M 2/263 429/94 |
| 2011/0223454 A1* | 9/2011 | Urano | ................. | H01M 2/0473 429/94 |
| 2011/0244280 A1* | 10/2011 | Byun | ................. | H01M 2/0404 429/61 |
| 2012/0135283 A1* | 5/2012 | Lee | ................. | H01M 2/1061 429/82 |
| 2012/0258342 A1* | 10/2012 | Tstsumi | ................. | H01G 11/66 429/94 |
| 2012/0328924 A1* | 12/2012 | Miyazaki | ................. | H01M 2/263 429/94 |
| 2013/0084471 A1* | 4/2013 | Han | ................. | H01M 2/043 429/7 |
| 2013/0095372 A1* | 4/2013 | Kim | ................. | H01M 2/18 429/178 |
| 2013/0101870 A1* | 4/2013 | Byun | ................. | H01M 2/348 429/7 |
| 2014/0120396 A1* | 5/2014 | Kajiwara | ................. | H01M 2/263 429/94 |
| 2014/0349149 A1* | 11/2014 | Kim | ................. | H01M 2/26 429/61 |
| 2015/0147637 A1 | 5/2015 | He et al. | | |
| 2015/0221926 A1* | 8/2015 | Yoshitake | ................. | H01M 10/04 429/179 |
| 2015/0236328 A1* | 8/2015 | Shinohara | ................. | H01M 2/263 429/178 |

FOREIGN PATENT DOCUMENTS

| | | |
|---|---|---|
| CN | 202495505 U | 10/2012 |
| CN | 102969477 A | 3/2013 |
| CN | 202949014 U | 5/2013 |
| CN | 203085698 U | 7/2013 |
| EP | 2346110 A1 | 7/2011 |
| EP | 2575189 A1 | 3/2012 |
| EP | 2581965 A1 | 4/2013 |
| JP | 2002-231214 A | 8/2002 |
| KR | 20030075782 A | 9/2003 |
| WO | 2014/033827 A1 | 3/2014 |
| WO | 2014/042005 A1 | 3/2014 |

* cited by examiner

CONNECTOR HAVING A NARROW TRANSITION PART DISPOSED BETWEEN TWO ADJACENT WINDING ELECTRODE CORES OF BATTERY, AND BATTERY COMPRISING THE SAME

CROSS REFERENCE TO RELATED APPLICATION

This application is a continuation application of International Application No. PCT/CN2015/076802, filed on Apr. 16, 2015, which is based on and claims priority to and benefits of Chinese Patent Application Nos. 201420358158.1 and 201420352774.6, both filed with State Intellectual Property Office of China on Jun. 30, 2014. The entire contents of the above referenced applications are incorporated herein by reference.

FIELD

The present disclosure generally relates to a battery field, especially relates to a connector for battery and a battery having the same.

BACKGROUND

Currently, interference between a conventional connector for battery and a tab of a battery cannot be avoided due to structure limitation of the connector, which may result in a wrinkle on a coating region of the tab.

SUMMARY

Embodiments of the present disclosure seek to solve at least one of the problems existing in the related art to at least some extent.

According to a first aspect of present disclosure, there is provided a connector for battery, which includes: a terminal connecting part configured to be connected with an electrode terminal of the battery; an electrode core connecting part configured to be connected with a winding electrode core of the battery, and having a first connecting plate and a second connecting plate opposite to each other; and a transition part connected between the terminal connecting part and the electrode core connecting part, configured to be fitted within a gap between two tabs of two adjacent winding electrode cores, and having a shape matched with that of the gap.

According to a second aspect of the present disclosure, there is provided a battery, which includes: a shell; a cover plate connected with the shell and defining a chamber with the shell; at least two winding electrode cores received within the chamber side by side, the winding electrode core comprising a main body and a tab formed at an end of the main body, the tab comprising a plate part and two arc parts disposed at two ends of the plate part respectively; an electrode terminal extended out of the chamber through the cover plate; and a battery connector including an electrode core connecting part electrically connected with the plate part of the tab, a terminal connecting part electrically connected with the electrode terminal, and a transition part of the battery connector disposed between two adjacent arc parts of two adjacent tabs of two adjacent winding electrode cores.

The connector for battery according to embodiments of the present disclosure has a simple structure, a high material utilization and a low cost. In addition, since the shape of the transition part is matched with the shape of the gap between two adjacent tabs, interference between the transition part and the two adjacent tabs can be avoided, such that the battery may be protected from being destroyed by the interference between the connector and the tab, especially when a great shock is occurred to the battery, a collision between the connector and the tab may be avoided, and thus a working life of the battery can be increased. Therefore, the battery according to embodiments of the present disclosure, which has the connector for battery according to above embodiments of the present disclosure, is easy to be manufactured and has a good performance and a long working life.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The disclosure is illustrated in the accompanying drawings, in which.

DETAILED DESCRIPTION

Figure 1:
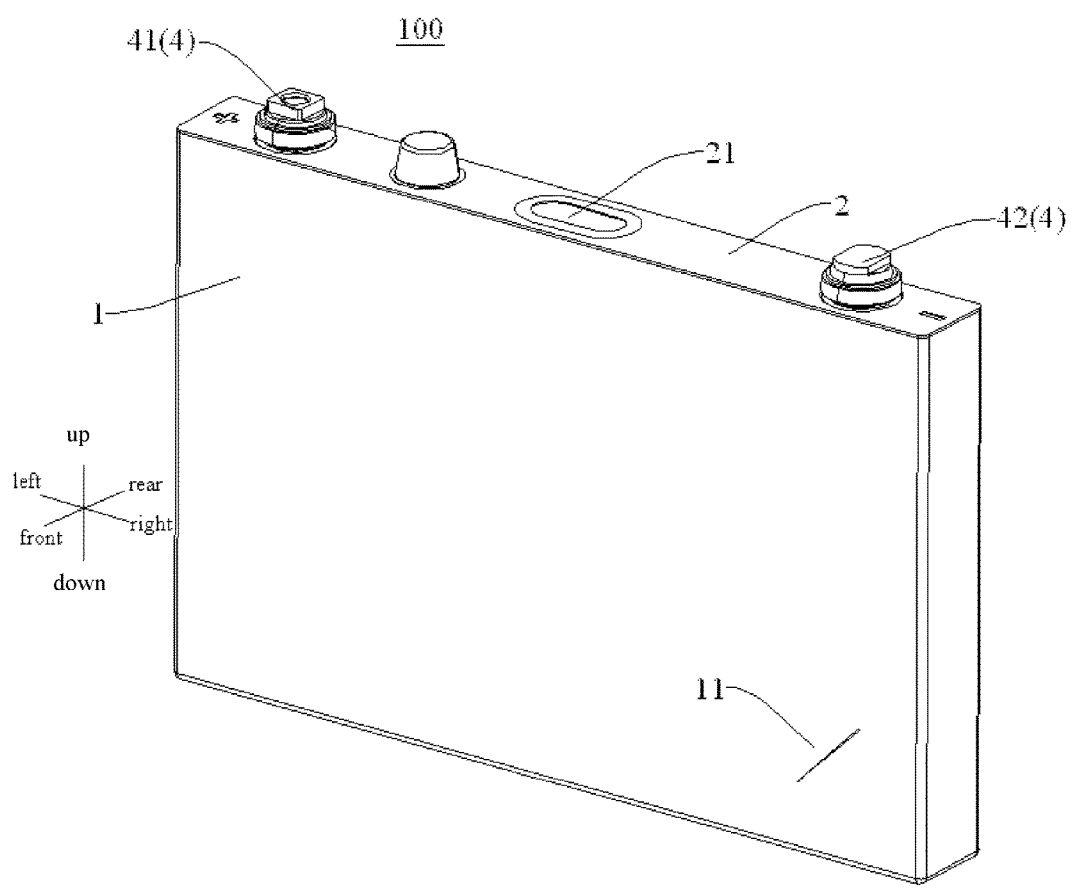
FIG. 1 is a perspective view of a battery according to an embodiment of present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "longitudinal", "lateral", "front", "rear", "right", "left", "lower", "upper", "vertical", "above", "below", "up", "top", "bottom" as well as derivative thereof (e.g., "downwardly", "upwardly", etc.) should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interaction between two elements. Those having ordinary skills in the art should understand the specific meanings in the present disclosure according to specific situations.

As shown in FIGS. 1-5, a connector 5 for battery and a battery having the same are provided.

Figure 2:
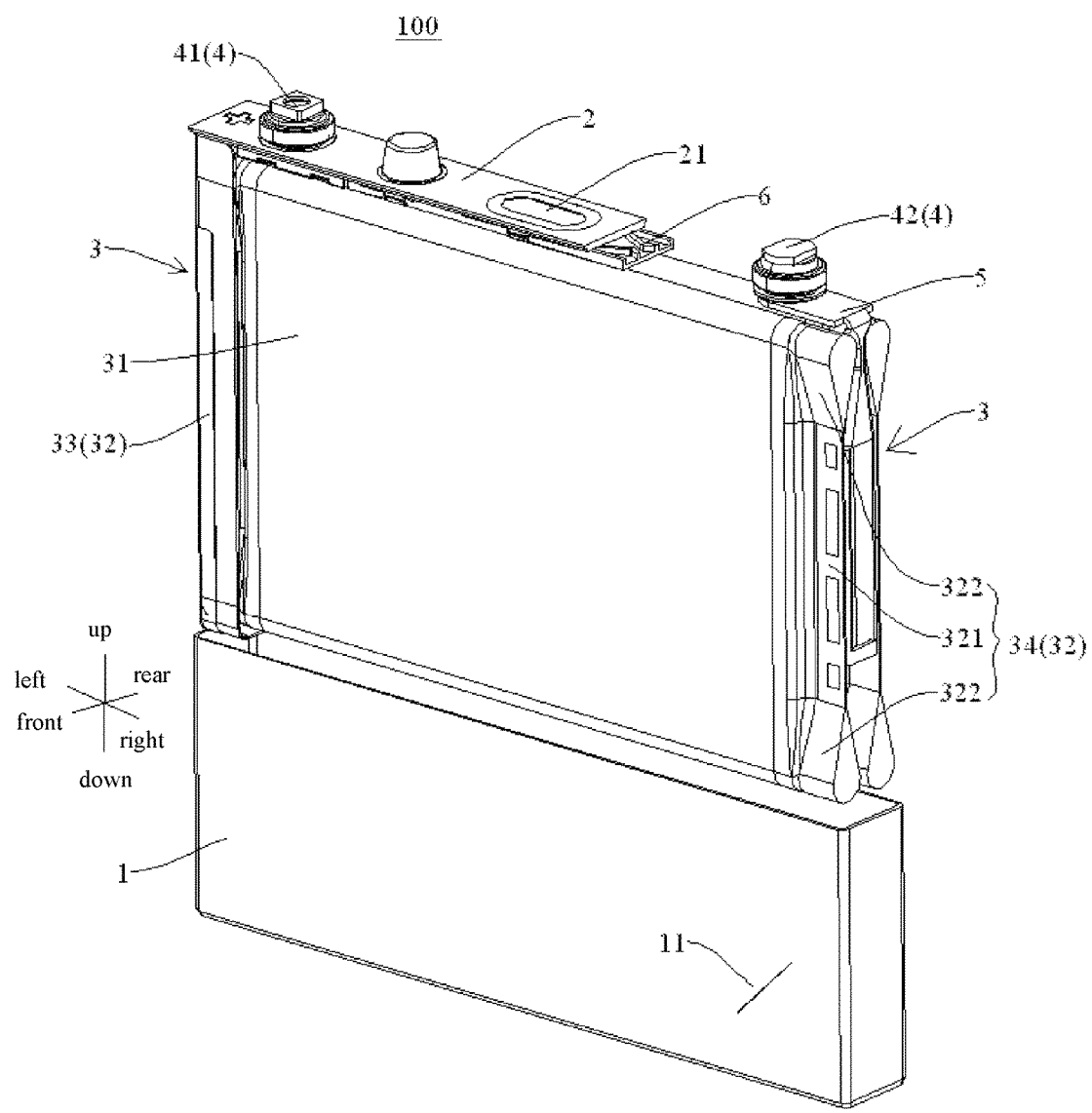
FIG. 2 is an exploded view of a battery according to an embodiment of present disclosure.

The connector 5 may be used to connect a winding electrode core 3 of the battery with an electrode terminal 4 of the battery. It should be noted that the winding electrode core 3 is well known by those skilled in the related art. For example, the winding electrode core 3 includes a coated region and an uncoated region, as shown in FIG. 2, and the uncoated region is configured as a tab 32 of the winding electrode core 3.

Specifically, the winding electrode core 3 is formed by laminating a positive electrode sheet, a separator and a negative electrode sheet in turn and then winding them. Each of the positive electrode sheet and the negative electrode sheet includes a coated region and an uncoated region. The uncoated region of the positive electrode sheet may be configured as a positive winding tab after being winded, and the uncoated region of the negative electrode sheet may be configured as a negative winding tab after being winded. Then, the positive winding tabs were pressed to be close to each other and thereby to form a positive tab 33, and the negative winding tabs were pressed to be close to each other and thereby to form a negative tab 34. The positive tab 33 and the negative tab 34 may be disposed on two ends of the winding electrode core 3 respectively. For example, as shown in FIG. 2, the positive tab 33 is formed at a left end of the winding electrode core 3, and the negative tab 34 is formed at a right end of the winding electrode core 3. The tab 32 (such as the positive tab 33 or the negative tab 34) is configured to be connected with the connector 5. This structure of winding electrode core 3 may be mainly used in an energy storage lithium ion battery or a vehicle lithium ion power battery, which is well known for a person skilled in the related art.

The tab 32 includes a plate part 321 and two arc parts 322 disposed at two ends of the plate part 321 respectively. As shown in FIG. 2, the two arc parts 322 are disposed at upper and lower ends of the plate part 321 respectively. That is, when the tab 32 (such as the positive winding tab and the negative winding tab) is to be pressed, a central section of the tab 32 is pressed to form the plate part 321, while an un-pressed section (namely an upper section and a lower section) of the tab 32 is deformed to form the arc part 322, and thus the two arc parts 322 are formed on the upper and lower ends of the plate part 321 respectively. For example, as shown in FIG. 2, each of the two arc parts 322 formed on the two ends of the plate part 321 has a shape of water drop.

The positive tab 33 and the negative tab 34 may be converted to each other depending on an actual battery structure. For example, the battery shown in FIG. 2, in which the positive tab 33 is disposed at the left end of the winding electrode core 3, only represents one example, and the positive tab 33 may also be disposed at the right end of the winding electrode core 3 according to an actual situation, which is not limited to the embodiment shown in FIG. 2.

In some embodiments of the present disclosure, the battery includes a shell 1, a cover plate 2 and an electrode terminal 4. The cover plate 2 is connected with the shell 1 to define a chamber with the shell 1. The winding electrode core 3 and electrolyte solution are received in the chamber. In some embodiments, the battery includes two electrode terminals 4 disposed on the cover plate 2 and extended out of the chamber through the cover plate 2. The two electrode terminals 4 are disposed close to the taps 32 of the winding electrode core 3 respectively. For example, in one embodiment, as shown in FIG. 2, a first electrode terminal 4 is adjacent to the positive tap 33 at the left end of the winding electrode core 3 and connected with the positive tab 33 via the connector 5, and thus the first electrode terminal 4 is configured as a positive electrode terminal 41; while a second electrode terminal 4 is adjacent to the negative tap 34 at the right end of the winding electrode core 3 and connected with the negative tab 34 via the connector 5, and thus the second electrode terminal 4 is configured as a negative electrode terminal 42.

The connector 5 according to embodiments of the present disclosure will be described in detail by referring to FIGS. 2-5 below. The connector 5 includes a terminal connecting part 51, an electrode core connecting part 52 and a transition part 53. In one embodiment, the connector 5 is integrally formed, i.e., the terminal connecting part 51, the electrode core connecting part 52 and the transition part 53 are integrally formed. For example, the connector 5 may be formed by punching and bending a metal member, and thus connection strength of the connector 5 may be improved.

Figure 3:
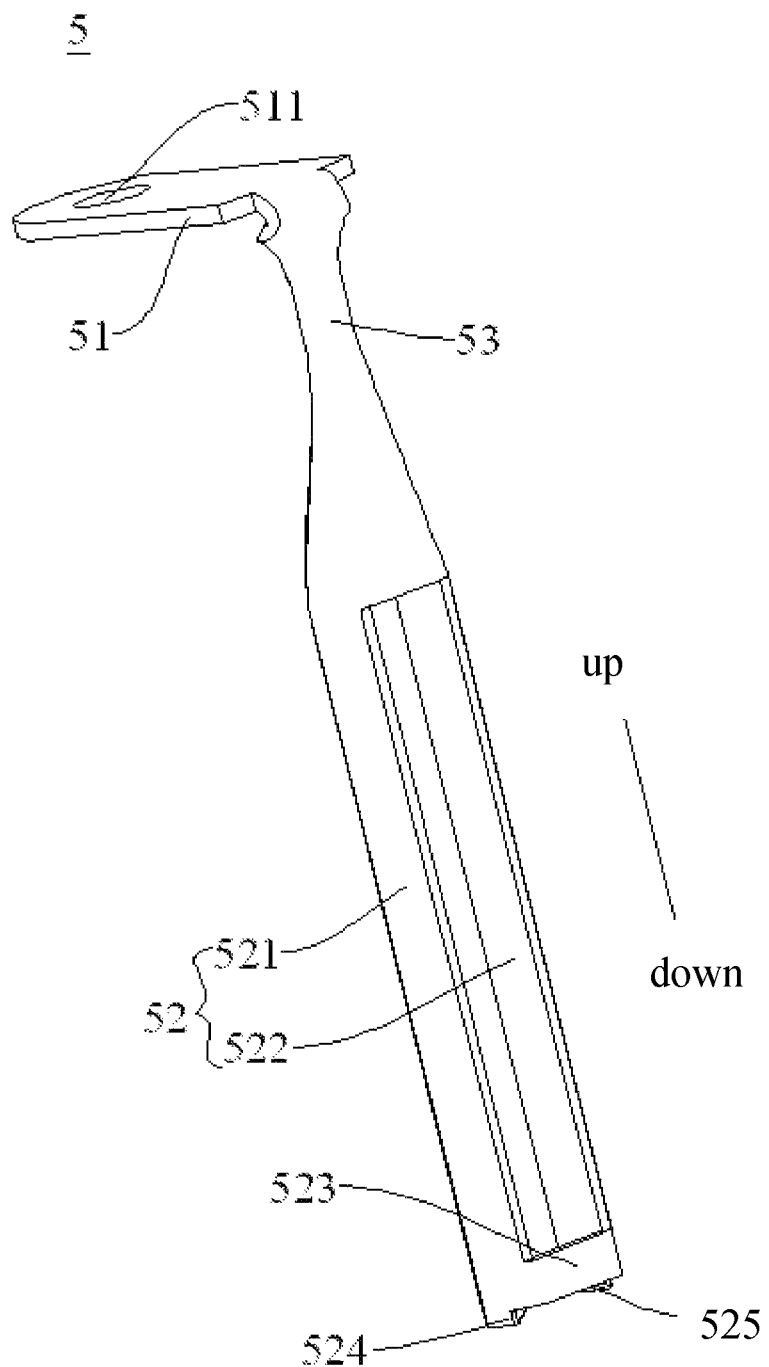
FIG. 3 is a perspective view of a connector for battery according to an embodiment of the present disclosure.

As shown in FIG. 2 and FIG. 3, the terminal connecting part 51 is configured to be connected with the electrode terminal 4 of the battery. In some embodiments, the terminal connecting part 51 may be configured as a terminal connecting plate 51. Specifically, the electrode terminal 4 is disposed on the cover plate 2 which has a through hole, the terminal connecting plate 51 has a connecting hole 511 corresponding to the through hole in the cover plate 2, and after the connector 5 is properly installed, the electrode terminal 4 passes through the through hole and the connecting hole 511 so as to be connected with the terminal connecting plate 51.

In some embodiments, as shown in FIG. 3, the electrode core connecting part 52 is disposed under the terminal connecting part 51 and includes a first connecting plate 521 and a second connecting plate 522 opposite to each other. For example, in one embodiment, both the first connecting plate 521 and the second connecting plate 522 have a sheet shape and are parallel to each other, i.e., length directions of the first connecting plate 521 and the second connecting plate 522 are extended in a same direction, and width directions of the first connecting plate 521 and the second connecting plate 522 are extended in a same direction, as shown in FIG. 2 and FIG. 3. Thus, main flat surfaces of the first connecting plate 521 and the second connecting plate 522 are opposite to each other. The main flat surface of the first connecting plate 521 is a flat surface whose area is maximum of the first connecting plate 521, and the main flat surface of the second connecting plate 522 is a flat surface whose area is maximum of the second connecting plate 522. The term "parallel" may be understood broadly, for example, the first connecting plate 521 and the second connecting plate 522 may be parallel to each other ideally or proximately. In some embodiments of the present disclosure, the electrode core connecting part 52 is connected with two adjacent winding electrode cores 3.

Specifically, the first connecting plate 521 and the second connecting plate 522 are connected to two adjacent plate parts 321 of two adjacent tabs 32 respectively by welding or adhering. Since the two adjacent plate parts 321 of the two adjacent tabs 32 are parallel with each other, by providing two connecting plates (namely the first connecting plate 521 and the second connecting plate 522) parallel to each other, a paralleling welding or adhering may be carried out between the connecting plate and the plate part, so as to avoid a wrinkle of the tabs 32 and improve performance of the battery.

In some embodiments, the transition part 53 is disposed between the terminal connecting part 51 and the electrode core connecting part 52 so as to connect the terminal connecting part 51 with the electrode core connecting part 52. That is, as shown in FIG. 2, an upper end of the transition part 53 is connected with the terminal connecting part 51, and a lower end of the transition part 53 is connected with the electrode core connecting part 52. The transition part 53 is configured to be disposed within a gap between two adjacent tabs 32 of two adjacent winding electrode cores 3 and a shape of the transition part 53 is matched with that of the gap. For example, as shown in FIG. 2, since the tab 32 including the plate part 321 and two arc parts 322 disposed at two ends of the plate part 321 respectively, a size of the gap between the two adjacent tabs 32 of the two adjacent winding electrode cores 3 is variable, for example, the size of the gap between the two adjacent tabs 32 decreases in a direction from the plate part 321 to the arc part 322 located at an upper end of the plate part 321. The shape of the transition part 53 being matched with that of the gap means that the size of the transition part 53 varies in a same trend as the gap between the two adjacent tabs 32. For example, as shown in FIG. 2, the size of the transition part 53 decreases in a direction from down to up. Thus, when the connector 5 is properly installed, the transition part 53 may be accommodated well between two adjacent tabs 32. In some embodiments, for the above purpose, the size of the transition parts 53 is slightly smaller than that of the gap between the two adjacent tabs 32 in positions thereof corresponding to each other. Therefore, interference between the transition part 53 and the adjacent tabs 32 can be avoided.

The connector 5 according to embodiments of the present disclosure has a simple structure, a high material utilization and a low cost. In addition, since the shape of the transition part 53 is matched with that of the gap, the interference between the transition part 53 and the adjacent tabs 32 may be avoided, such that the battery may be protected from being destroyed by the interference between the transition part 53 and the adjacent tabs 32, especially when a shock occurs to the battery, a collision between the connector 5 and the tab 32 may be avoided, and thus a working life of the battery can be increased.

In some embodiments, the transition part 53 may be configured as a curling part. For example, the transition part 53 is formed by curling a metal plate. Specifically, as shown in FIGS. 3 and 4, the transition part 53 is formed by curling a metal plate towards the winding electrode core 3, and thus a surface of the transition part 53 may be configured as a smooth cambered surface.

As shown in FIGS. 2-5, the shape of the transition part 53 is matched with that of the gap between the two adjacent tabs 32, i.e., the size of the transition part 53 is gradually decreased in the direction from down to up. When the size of the transition part 53 is reduced to a certain level, in order to connect the transition part 53 with the terminal connecting part 51, the size of the transition part 53 may be then increased from down to up.

Specifically, as shown in FIGS. 2 to 5, the transition part 53 includes a narrowest portion 531 whose width is about ¼ to ⅓ of a width of a gap between the first connecting plate 521 and the second connecting plate 522. For example, the narrowest portion 531 is located in a narrowest gap between the two adjacent tabs 32, i.e., the narrowest portion 531 has a location in which the width of the gap between two adjacent tabs 32 is minimum. With the narrowest portion 531 whose width is about ¼ to ⅓ of the width of the gap between the first connecting plate 521 and the second connecting plate 522, the interference between the transition part 53 and the adjacent tabs 32 can be further avoided, and when an abnormal situation occurs, for example, when a short circuit of the winding electrode core 3 occurs, heat generated by the short circuit can be gathered to the narrowest portion 531, and thus the connector 5 can be easily broken so as to protect the battery.

Figure 4:
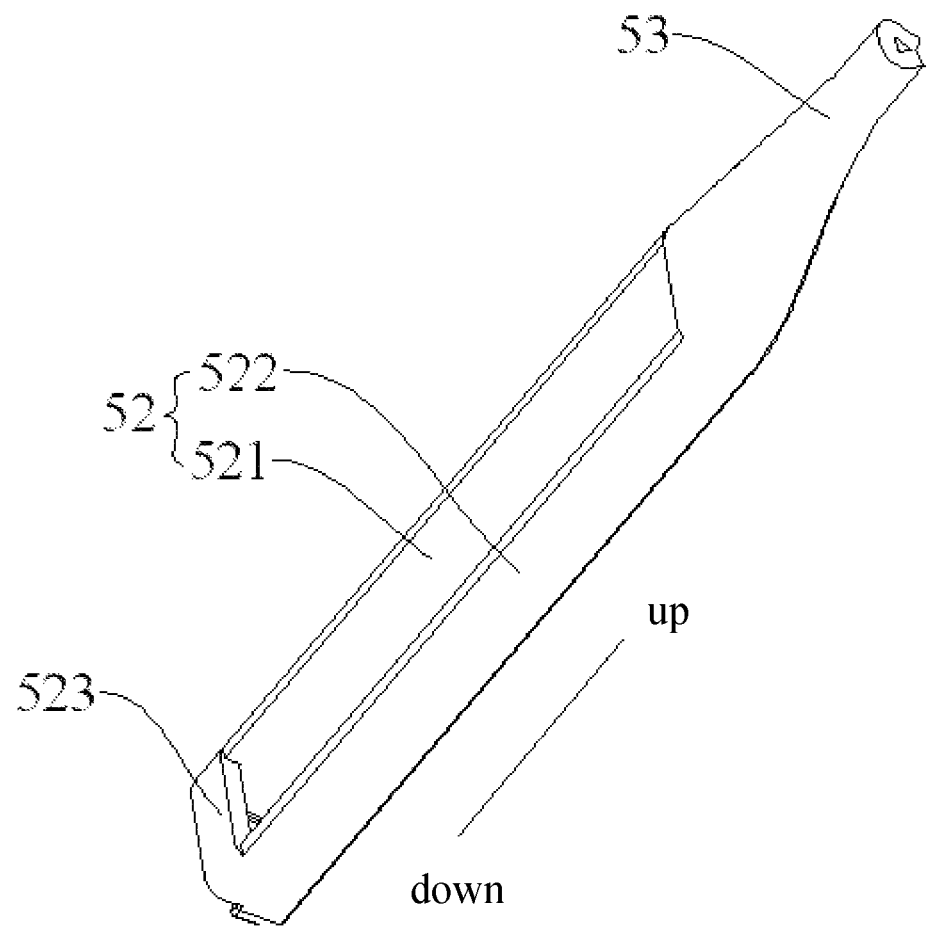
FIG. 4 is a perspective view of a connector for battery without a terminal connecting part according to an embodiment of the present disclosure.
Figure 5:
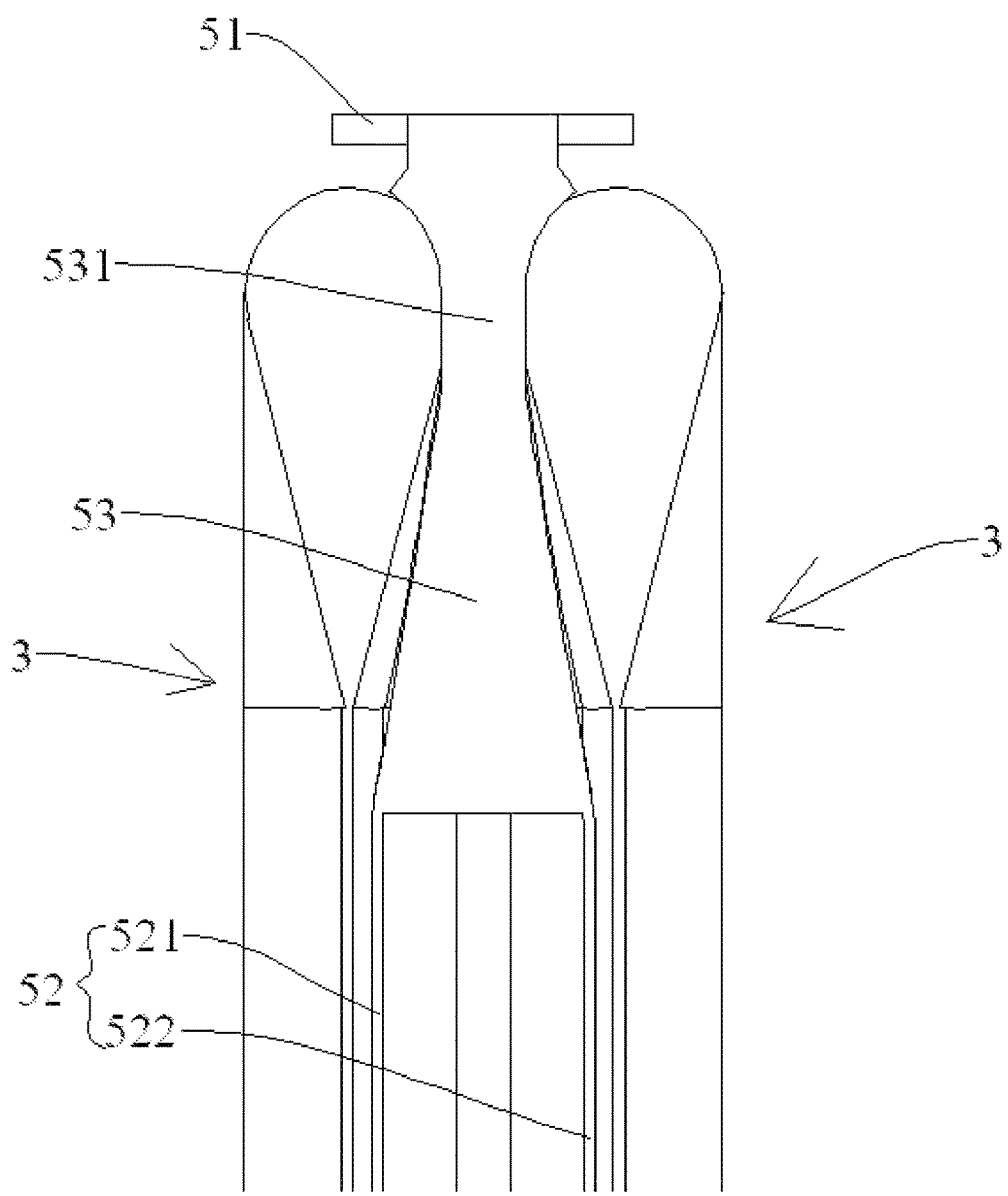
FIG. 5 is a partially front view of a connector for battery fitted with a winding electrode core according to an embodiment of the present disclosure.

In some embodiments, the connector 5 further includes a supporting member 523 disposed between the first connecting plate 521 and the second connecting plate 522, as shown in FIGS. 2 to 4. With the supporting member 523, the width of the gap between the first connecting plate 521 and the second connecting plate 522 can be ensured to some extent, that is, it may be ensured that the first connecting plate 521 and the second connecting plate 522 are parallel to each other, and thus a good welding or adhering strength between the connector 5 and the tabs 32 may be ensured.

In one embodiment, the supporting member 523 may be configured as a supporting plate 523, a first end of the supporting plate 523 is connected to the first connecting plate 521, and a second end of the supporting plate 523 is connected to the second connecting plate 522. In some embodiments, the supporting plate 523 is vertical to the first connecting plate 521 and the second connecting plate 522 respectively, and thus it is further ensured that the first connecting plate 521 and the second connecting plate 522 are parallel to each other.

In some embodiments, the supporting member 523 is connected with same side edges of the first connecting plate 521 and the second connecting plate 522. That is, as shown in FIG. 3, the supporting member 523 is connected to same back-end side edges of the first connecting plate 521 and the second connecting plate 522. In one embodiment, the supporting member 523, the first connecting plate 521 and the second connecting plate 522 are integrally formed.

In one embodiment, the connector 5 includes one supporting plate 523 adjacent to lower ends of the first connecting plate 521 and the second connecting plate 522 respectively, and thus the connector 5 may have a simple structure. In another embodiment, the connector 5 includes a plurality of the supporting plate 523 spaced from each other in a longitude direction (not shown), and thus a supporting effect on the first connecting plate 521 and the second connecting plate 522 of the supporting member 523 can be improved.

In some embodiments, the first connecting plate 521 includes a first bending portion 524 disposed at a lower end thereof, the second connecting plate 522 includes a second bending portion 525 disposed at a lower end thereof, and the first bending portion 524 and the second bending portion 525 are extended towards each other, as shown in FIG. 3. Therefore, the lower ends of the first connecting plate 521 and the second connecting plate 522 may be more smooth, and there is no sharp corner at the lower end of each of the connecting plate 521 and the second connecting plate 522, such that the tab 32 may be protected from being scratched by the first connecting plate 521 and the second connecting plate 522.

As shown in FIG. 1 and FIG. 2, a battery 100 is provided. The battery 100 according to embodiments of the present disclosure includes: a shell 1, a cover plate 2, at least two winding electrode cores 3, an electrode terminal 4 and a connector 5 for battery mentioned above.

The cover plate 2 is connected with the shell 1 so as to define a chamber (not shown) with the shell 1. Specifically, in one embodiment, the shell 1 has an open upper end, and the cover plate 2 is configured to be connected with the shell 1 to cover the open upper end and further to seal the shell 1. The at least two winding electrode cores 3 are received within the chamber side by side. The battery 100 may include two, three, four or more winding electrode cores, which is depended on an actual need or a capacity of the battery 100. For the purpose of description, the battery 100 including two winding electrode cores 3 will be described below.

Each winding electrode core 32 includes a main body 31 and two tabs 32 formed at a left end and a right end of the main body 31 respectively. The left end and the right end of the main body 31 may be defined according to a using state of the battery 100. For example, as shown in FIG. 2, one of the two tabs 32 is formed at the left end of the main body 31, and the other one is formed at the right end of the main body 31. The main body 31 is formed by the coated region mentioned above, and the tab 32 is formed by the uncoated region mentioned above. The tab 32 includes a plate part 321 formed by pressing and two arc parts 322 without pressing and disposed at two ends of the plate part 321 respectively. The battery 100 may include two electrode terminals 4, and the two electrode terminals 4 are extended out of the chamber through the cover plate 2 and adjacent to the taps 32 at the ends of the winding electrode core 3 respectively.

In one embodiment, the battery 100 includes two connectors 5 mentioned above. The two connectors 5 are disposed at two ends of the two adjacent winding electrode cores 3 respectively, such as a left end and a right end shown in FIG. 2. For example, in one embodiment, the tab 32 disposed at the left end is configured as a positive tab 33, and the tab 32 disposed at the right end is configured as a negative tab 34, then the electrode terminal 4 disposed at the left end is configured as a positive terminal 41, and the electrode terminal 4 disposed at the right end is configured as a negative terminal 42, and then the connector 5 disposed at the left end is configured to connect the positive tab 33 and the positive terminal 41, and the connector 5 disposed at the right end is configured to connect the negative tab 34 and the negative terminal 42.

In embodiments of the present disclosure, the electrode core connecting part 52 of the connector 5 is electrically connected to the plate part 321 of the tab 32. In one embodiment of the present disclosure, the first connecting plate 521 and the second connecting plate 522 are connected with two plate parts 321 of two adjacent tabs 32 of two adjacent winding electrode cores 3 respectively by welding or adhering. The terminal connecting part 51 is electrically connected to the electrode terminal 4. In one embodiment of the present disclosure, the terminal connecting plate 51 is extended to the cover plate 2 to be connected with the electrode terminal 4. The transition part 53 is fitted between two adjacent arc parts 322 of two adjacent tabs 32 of two adjacent winding electrode cores 3. In some embodiments, the transition part 53 is configured as an arc section fitted between the two adjacent arc parts 322 of the two adjacent tabs 32 of the two adjacent winding electrode cores 3. A size of the gap between the two adjacent arc parts 322 of the two adjacent tabs 32 is gradually decreased in a direction towards middle of the gap, and the shape of the transition part 53 is matched with a shape of the gap between the two adjacent arc parts 322 of the two adjacent tabs 32. In other words, the shape of the transition part 53 and the shape of the gap between the two adjacent arc parts 322 of the two adjacent tabs 32 are substantially the same.

In some embodiments of the present disclosure, the cover plate 2 is disposed at one end of the shell 1. For example, as shown in FIG. 1 and FIG. 2, the cover plate 2 is disposed at an upper end of the shell 1, and the battery 100 includes two electrode terminals 4 disposed on the cover plate 2. In some embodiments, the battery 100 may include two cover plates 2, and the two cover plates 2 are disposed at two ends (upper and lower ends) of the shell 1 respectively, i.e., the two cover plates 2 are configured to seal the upper end and the lower end of the shell 1 respectively. Then, the two electrode terminals 4 may be disposed on a same cover plate 2 disposed at one end of the shell 1, or disposed on different cover plates 2 disposed at the two ends of the shell 1 respectively. In the embodiment, the battery 100 includes two connectors 5 to cooperate with the two electrode terminals 4.

Since the connector 5 has a high structure strength and is easy to be manufactured, and the connector 5 can be protected from being damaged by the interference between the connector 5 and the tab 32 by disposing the transition part 53, the battery 100 having the connector 5 according to embodiments of the present disclosure is easy to be manufactured and has a good performance and a long working life.

The first connecting plate 521 and the second connecting plate 522 are connected with the two plate parts 321 of the two adjacent tabs 32 of the two adjacent winding electrode cores 3 respectively. In one embodiment of the present disclosure, the first connecting plate 521 is connected with a first surface of one of the two plate parts 321 and the second connecting plate 522 is connected with a second surface of the other of the two plate parts 321 opposite to the first surface of the one of the two plate parts 321, such that a connection structure between the electrode core connecting part 52 and the tab 32 is simple and it is easy to connect the electrode core connecting part 52 with the tab 32. Also, with the transition part 53, the battery 100 may be protected from being damaged, for example, when a short circuit occurs, the transition part 53 may be fused to cut off the current so as to protect the battery 100.

In some embodiments of the present disclosure, the battery 100 further includes an explosion-proof valve 21 disposed on the cover plate 2. In one embodiment of the present disclosure, the explosion-proof valve 21 is configured as an explosion-proof sheet disposed on the cover plate 2. In one embodiment of the present disclosure, the battery further includes a snick 11 carved thereon, i.e., the snick 11 is formed in a main surface of the shell 1. A thickness of a part of the shell 1 in which the snick 11 is formed is less than those of other parts of the shell 1. With the snick 11, when an abnormal bulge occurs, the snick 11 may be cracked to relief pressure. In one embodiment of the present disclosure, the snick 11 has a shape of straight line and is extended vertically to a diagonal line of the main plating surface of the shell 1, and thus the snick 11 may be easily cracked when the abnormal bulge occurs, and safety performance of the battery 100 may be improved. Also, with the explosion-proof valve 21 disposed on the cover plate 2, cracking and pressure relieving requirements can be satisfied when a plurality of the battery 100 forms a battery pack and an abnormal situation appears, i.e., the explosion-proof vale 21 can be broken so as to relief pressure under abnormal situations. Therefore, the explosion-proof valve 21 and the snick 11 provide a dual protection for the battery 100, and the safety performance of the battery 100 is further improved.

In some embodiments of the present disclosure, the battery 100 further includes a first insulating element 6 and a second insulating element. The first insulating element 6 is disposed between the cover plate 2 and the terminal connecting part 51 to separate the cover plate 2 and the terminal connecting part 51, such that the cover plate 2 and the terminal connecting part 51 can be well insulated with each other. The second insulating element is disposed between the winding electrode core 3 and the terminal connecting part 51 to separate the winding electrode core 3 and the terminal connecting part 51, such that the winding electrode core 3 and the terminal connecting part 51 can be well insulated with each other. Thus, with the first and second insulating elements, performance and reliability of the battery 100 can be improved.

In some embodiments of the present disclosure, each of the first insulating element 6 and the second insulating element has a shape of strip and is extended over the cover plate 2 in a length direction of the cover plate 2, and thus an insulation performance can be further improved. In one embodiment, the first insulating element 6 is connected with the second insulating element via a snap-fit structure. Therefore, connection between the first insulating element 6 and the second insulating element is simple and stable.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A connector for a battery, comprising:
a terminal connecting part configured to be connected with an electrode terminal of the battery;
an electrode core connecting part configured to be connected with a winding electrode core of the battery, and having a first connecting plate and a second connecting plate opposite and parallel to each other; and
a transition part connected between the terminal connecting part and the electrode core connecting part, configured to be fitted between two tabs of two adjacent winding electrode cores, wherein the transition part has a narrowest portion that has a width narrower than other portions of the transition part, the narrowest portion of the transition part being disposed between the two tabs of the two adjacent winding electrode cores, wherein a width of the transition part decreases in a direction from the electrode core connecting part to the narrowest portion and increases in a direction from the narrowest portion to the terminal connecting part.

2. The connector of claim 1, wherein the terminal connecting part is configured as a terminal connecting plate.

3. The connector of claim 1, wherein the width of the narrowest portion of the transition part is about ¼ to ⅓ of a width of a gap between the first connecting plate and the second connecting plate.

4. The connector of claim 1, wherein the transition part has a smooth cambered surface.

5. The connector of claim 1, wherein the transition part is configured as a curling part.

6. The connector of claim 1, further comprising a supporting member connected between the first connecting plate and the second connecting plate.

7. The connector of claim 6, wherein the supporting member is configured as a supporting plate vertical to the first connecting plate and the second connecting plate respectively.

8. The connector of claim 6, wherein the supporting member is connected with the same side edges of the first connecting plate and the second connecting plate respectively.

9. The connector of claim 6, wherein the supporting member is adjacent to lower ends of the first and second connecting plates.

10. The connector of claim 1, wherein the first connecting plate has a first bending portion at a lower end thereof, the second connecting plate has a second bending portion at a lower end thereof, and the first bending portion and the second bending portion are extended toward each other.

11. The connector of claim 1, wherein the connector is integrally formed.

12. A battery, comprising:
a shell;
a cover plate connected with the shell and defining a chamber with the shell;
at least two winding electrode cores received within the chamber side by side, each of the winding electrode cores comprising a main body and a tab formed at an end of the main body, the tab comprising a plate part and two arc parts disposed at two ends of the plate part respectively;
an electrode terminal extended out of the chamber through the cover plate; and
a battery connector according to claim 1,
wherein the electrode core connecting part of the connector is electrically connected with the plate part of the tab, the terminal connecting part of the connector is electrically connected with the electrode terminal, and the transition part of the battery connector is disposed between two adjacent arc parts of two adjacent tabs of two adjacent winding electrode cores.

13. The battery of claim 12, comprising two electrode terminals and two battery connectors, wherein the two electrode terminals are disposed at a same end of the shell.

14. The battery of claim 12, wherein the transition part is configured as an arc section fitted between the two adjacent arc parts of the adjacent two tabs of the two adjacent winding electrode cores.

15. The battery of claim 12, wherein the first connecting plate and the second connecting plate are connected with the two plate parts of the two adjacent tabs of the two adjacent winding electrode cores respectively.

16. The battery of claim 15, wherein the first connecting plate is connected with a first surface of one of the two plate parts and the second connecting plate is connected with a second surface of the other of the two plate parts opposite to the first surface of the one of the two plate parts.

17. The battery of claim 12, further comprising an explosion-proof valve disposed on the cover plate.

18. The battery of claim 16, wherein the explosion-proof valve is configured as an explosion-proof sheet.

19. A battery, comprising:
- a shell;
- a cover plate connected with the shell and defining a chamber with the shell;
- at least two winding electrode cores received within the chamber side by side, the winding electrode cores each comprising a main body and a tab formed at an end of the main body, the tab comprising a plate part and two arc parts disposed at two ends of the plate part respectively;
- an electrode terminal extended out of the chamber through the cover plate; and
- a battery connector comprising:
  - an electrode core connecting part electrically connected with the plate part of the tab, and having a first connecting plate and a second connecting plate opposite and parallel to each other,
  - a terminal connecting part electrically connected with the electrode terminal, and
  - a transition part disposed between two adjacent arc parts of two adjacent tabs of two adjacent winding electrode cores, wherein the transition part has a narrowest portion that has a width narrower than other portions of the transition part, the narrowest portion of the transition part being disposed between the two adjacent arc parts of the two adjacent tabs of the two adjacent winding electrode cores, wherein a width of the transition part decreases in a direction from the electrode core connecting part to the narrowest portion and increases in a direction from the narrowest portion to the terminal connecting part.

* * * * *